(12) United States Patent
Badesha et al.

(10) Patent No.: US 7,208,259 B2
(45) Date of Patent: Apr. 24, 2007

(54) AMINO-FUNCTIONAL FUSING AGENT

(75) Inventors: Santokh S. Badesha, Pittsford, NY (US); David J. Gervasi, West Henrietta, NY (US); George A. Gibson, Fairport, NY (US); Douglas B. Wilkins, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 400 days.

(21) Appl. No.: 10/995,966

(22) Filed: Nov. 22, 2004

(65) Prior Publication Data
US 2006/0110611 A1    May 25, 2006

(51) Int. Cl.
*G03G 13/20* (2006.01)
(52) U.S. Cl. .................. 430/124; 399/333; 428/447
(58) Field of Classification Search ............... 430/124; 399/333; 428/447
See application file for complete search history.

(56) References Cited

U.S. PATENT DOCUMENTS 6,183,929 B1   2/2001   Chow et al. ............... 430/124

*Primary Examiner*—Mark A. Chapman
(74) *Attorney, Agent, or Firm*—Annette L. Bade

(57) ABSTRACT

A fuser member having a substrate, a layer thereover including a polymer, and, on the polymeric layer, a coating of a release agent having a mixture of (a) an organosiloxane polymer concentrate containing amino-substituted organosiloxane polymers, wherein there are amino functional groups on at least some of the polymer molecules of the concentrate, the concentrate has a degree of functionality of from about 0.3 to about 0.4 mole percent, the concentrate has a viscosity of from about 800 to about 1,300 centistokes; and (b) a nonfunctional organosiloxane polymer diluent, the diluent has a viscosity of from about 100 to about 2,000 centistokes; the mixture has a degree of functionality of from about 0.05 to about 0.3 mole percent, wherein the mixture has a viscosity of from about 550 to about 1,300 centistokes, and wherein the ratio by weight of concentrate to diluent is from about 1:2 to about 1:30, and an image forming apparatus having the fuser member.

19 Claims, 3 Drawing Sheets

AMINO-FUNCTIONAL FUSING AGENT

BACKGROUND

Described herein are improved amino-functional release agents for the fusing of electrostatic toner particles. More specifically, herein are described amino-functional release agents, and to fuser members coated or impregnated therewith, that exhibit advantages such as long fuser release life, good adhesion of articles such as 3M Post-It® notes to prints made therewith, and the like. One embodiment is directed to a fuser member comprising a substrate, a layer thereover comprising a polymer, and, on the polymeric layer, a coating of a release agent comprising a mixture of (a) an organosiloxane polymer concentrate containing amino-substituted organosiloxane polymers, wherein there are amino functional groups on at least some of the polymer molecules of the concentrate, said concentrate having a degree of functionality of from about 0.3 to about 0.4 mole percent, said concentrate having a viscosity of from about 800 to about 1,300 centistokes; and (b) a nonfunctional organosiloxane polymer diluent, said diluent having a viscosity of from about 100 to about 2,000 centistokes; said mixture having a degree of functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support. It is desired in the fusing process that minimal or no offset of the toner particles from the support to the fuser member takes place during normal operations. Toner particles offset onto the fuser member can subsequently transfer to other parts of the machine or onto the support in subsequent copying cycles, thereby increasing the image background, causing inadequate copy quality, causing inferior marks on the copy, or otherwise interfering with the material being copied there as well as causing toner contamination of other parts of the machine. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release properties of the fuser member, and accordingly it is desirable to provide a fusing surface having a low surface energy to provide the necessary release.

To ensure and maintain good release properties of the fuser member, it has become customary to apply release agents to the fuser member during the fusing operation. Typically, these materials are applied as thin films of, for example, silicone oils, such as polydimethyl siloxane, or substituted silicone oils, such as amino-substituted oils, or the like, to prevent toner offset. In addition, fillers can be added to the outer layers of fuser members to increase the bonding of the fuser oil to the surface of the fuser member, thereby imparting improved release properties.

The use of polymeric release agents having functional groups which interact with a fuser member to form a thermally stable, renewable self-cleaning layer having good release properties for electroscopic thermoplastic resin toners, is described in, for example, U.S. Pat. No. 4,029,827, U.S. Pat. No. 4,101,686, and U.S. Pat. No. 4,185,140, the disclosures of each of which are totally incorporated herein by reference. Disclosed in U.S. Pat. No. 4,029,827 is the use of polyorganosiloxanes having mercapto functionality as release agents. U.S. Pat. No. 4,101,686 and U.S. Pat. No. 4,185,140 are directed to polymeric release agents having functional groups such as carboxy, hydroxy, epoxy, amino, isocyanate, thioether, and mercapto groups as release fluids.

It is desired to select the correct combination of fuser surface material, any filler incorporated or contained therein, and fuser oil. Specifically, it is desired that the outer layer of the fuser member react sufficiently with the selected fuser oil to obtain sufficient release. To improve the bonding of fuser oils with the outer surface of the fuser member, fillers have been incorporated into or added to the outer surface layer of the fuser members. The use of fillers can aid in decreasing the amount of fusing oil necessary by promoting sufficient bonding of the fuser oil to the outer surface layer of the fusing member. It is desired, however, that the filler not degrade the physical properties of the outer layer of the fuser member, and it is also desired that the filler not cause too much of an increase in the surface energy of the outer layer.

With regard to known fusing oils, silicone oil has been the preferred release agent for PFA Teflon coatings for fuser members. Release agents comprising silicone oil, however, do not provide sufficient release properties for toner because the silicone oil does not wet fuser coatings of PFA Teflon. Therefore, a large amount (greater than 5 mg/copy) of silicone oil is required to obtain minimum release performance. Alternatively, a large amount of wax must be incorporated into the toner in order to provide adequate release of the toner from the fuser member.

For other fluoropolymer, and especially fluoroelastomer, fuser member outer layers, amino silicone oil has been the release agent of choice. Amino oil, however, does not diffuse into paper products, but instead reacts with the cellulose in the paper and therefore remains on the surface of the paper. It is believed that hydrogen bonding occurs between the amine groups in the amino oil and the cellulose hydroxy groups of the paper. Alternatively, the amine groups can hydrolyze the cellulose rings in the paper. The amino oil on the surface of the copied paper prevents the binding of glues and adhesives, including attachable notes such as adhesive 3M Post-it® notes, to the surface of the copied paper. In addition, the amino silicone oil present on the surface of a copied paper prevents ink adhesion to the surface of the paper. This problem results in the poor fix of inks such as bank check endorser inks and other similar inks. Similar problems can also occur with mercapto-functional and functional fusing oils, although such problems are usually observed to a lesser extent than with amino-functional fusing oils.

U.S. Pat. No. 6,183,929 discloses amino- and mercapto-functional release agents, and fuser members coated or impregnated therewith, that exhibit advantages such as long fuser release life, good adhesion of articles such as 3M Post-It® notes to prints made therewith, and the like. The Abstract discloses a fuser member comprising a substrate, a layer thereover comprising a polymer, and, on the polymeric layer, a coating of a release agent comprising a mixture of (a) an organosiloxane polymer concentrate containing amino-substituted or mercapto-substituted organosiloxane polymers, wherein there are amino or mercapto functional groups on at least some of the polymer molecules of the concentrate, said percent, said concentrate having a viscosity of from about 50 to about 500 centistokes; and (b) a nonfunctional organosiloxane polymer diluent, said diluent having a viscosity of from about 100 to about 2,000 centistokes; said mixture having a degree of functionality of from about 0.05 to about 0.4 mole percent, wherein the mixture has a viscosity of from about 1,000 to about 2,000 centistokes, and wherein the ratio by weight of concentrate to diluent is from about 1:2 to about 1:30.

While the above release agent solved the problems of release life under minimal stresses, a need still remains for a fuser release agent that will provide extended fuser release life under stressful image conditions, such as higher speeds, higher toner coverage, higher fusing temperatures, and higher stress image sets. An additional need exists for a release agent, which allows the adhesion of post-it, notes, enhanced ability to write on print and bookbinding.

SUMMARY

Embodiments include a fuser member comprising a substrate, a layer thereover comprising a polymer, and, on the polymeric layer, a coating of a release agent comprising a mixture of (a) an organosiloxane polymer concentrate containing amino-substituted organosiloxane polymers, wherein there are amino functional groups on at least some of the polymer molecules of the concentrate, the concentrate having a degree of functionality of from about 0.3 to about 0.4 mole percent, the concentrate having a viscosity of from about 800 to about 1,300 centistokes; and (b) a nonfunctional organosiloxane polymer diluent, the diluent having a viscosity of from about 100 to about 2,000 centistokes; the mixture having a degree of amine functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

Embodiments further include an image forming apparatus for forming images on a recording medium, the apparatus comprising: (i) a charge-retentive surface capable of receiving an electrostatic latent image thereon; (ii) a development assembly to apply toner to the charge-retentive surface, thereby developing the electrostatic latent image to form a developed toner image on the charge retentive surface; (iii) a transfer assembly to transfer the developed toner image from the charge retentive surface to a copy substrate; and (iv) a fixing assembly to fuse the developed toner image to a surface of the copy substrate, wherein the fixing assembly comprises a fixing component comprising a substrate, a layer thereover comprising a polymer, and, on the polymeric layer, a coating of a release agent comprising a mixture of (a) an organosiloxane polymer concentrate containing amino-substituted organosiloxane polymers, wherein there are amino functional groups on at least some of the polymer molecules of the concentrate, the concentrate having a degree of functionality of from about 0.3 to about 0.4 mole percent, the concentrate having a viscosity of from about 800 to about 1,300 centistokes; and (b) a nonfunctional organosiloxane polymer diluent, the diluent having a viscosity of from about 100 to about 2,000 centistokes; the mixture having a degree of amine functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

Embodiments also include an image forming apparatus for forming images on a recording medium, the apparatus comprising: (i) a charge-retentive surface capable of receiving an electrostatic latent image thereon; (ii) a development assembly to apply toner to the charge-retentive surface, thereby developing the electrostatic latent image to form a developed toner image on the charge retentive surface; (iii) a transfer assembly to transfer the developed toner image from the charge retentive surface to a copy substrate; and (iv) a fixing assembly to fuse the developed toner image to a surface of the copy substrate, wherein the fixing assembly comprises a fixing component comprising a substrate, a layer thereover comprising a fluoroelastomer selected from the group consisting of a) copolymers of two of vinylidene fluoride, hexafluoropropylene, and tetrafluoroethylene; b) terpolymers of vinylidene fluoride, hexafluoropropylene, and tetrafluoroethylene; and c) tetrapolymers of vinylidene fluoride, hexafluoropropylene, tetrafluoroethylene, and a cure site monomer, and, on the fluoroelastomer layer, a coating of a release agent comprising a mixture of (a) an organosiloxane polymer concentrate containing amino-substituted organosiloxane polymers, wherein there are amino functional groups on at least some of the polymer molecules of the concentrate, the concentrate having a degree of functionality of from about 0.3 to about 0.4 mole percent, the concentrate having a viscosity of from about 800 to about 1,300 centistokes; and (b) a nonfunctional organosiloxane polymer diluent, the diluent having a viscosity of from about 100 to about 2,000 centistokes; the mixture having a degree of amine functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

DETAILED DESCRIPTION

Figure 1:
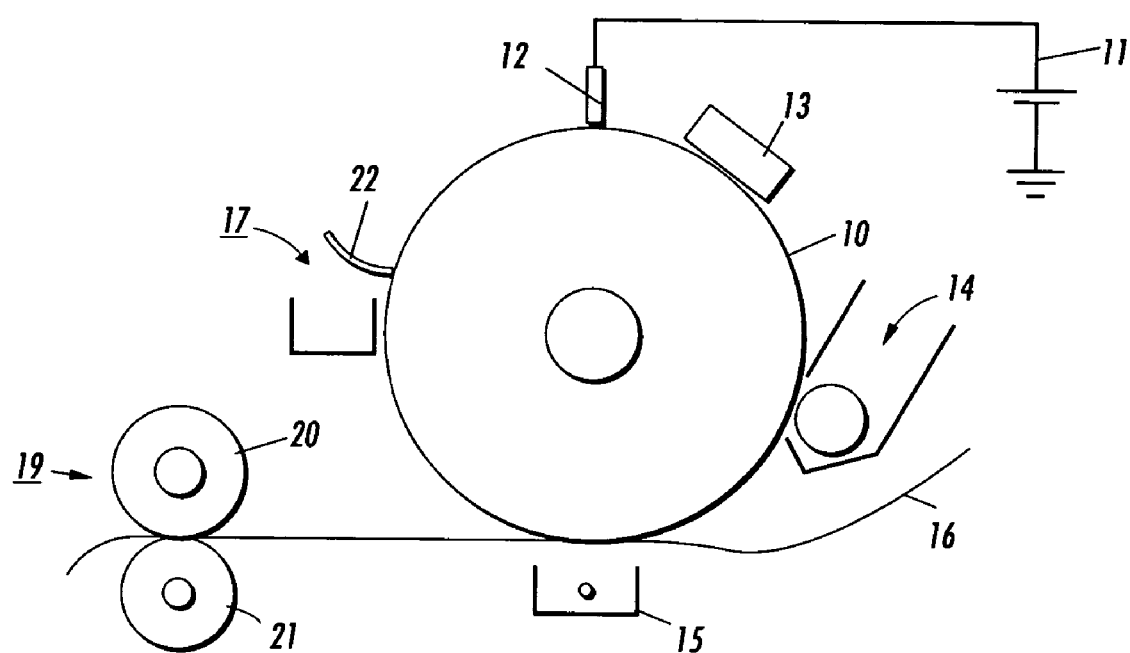
FIG. 1 is an illustration of a general electrostatographic apparatus.

Referring to FIG. 1, in a typical electrostatographic reproducing apparatus, a light image of an original to be copied is recorded in the form of an electrostatic latent image on a photosensitive member, and the latent image is subsequently rendered visible by the application of electroscopic thermoplastic resin particles, commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet.

After transfer of the developed image is completed, copy sheet 16 advances to fusing station 19, depicted in FIG. 1 as fusing and pressure rolls, wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
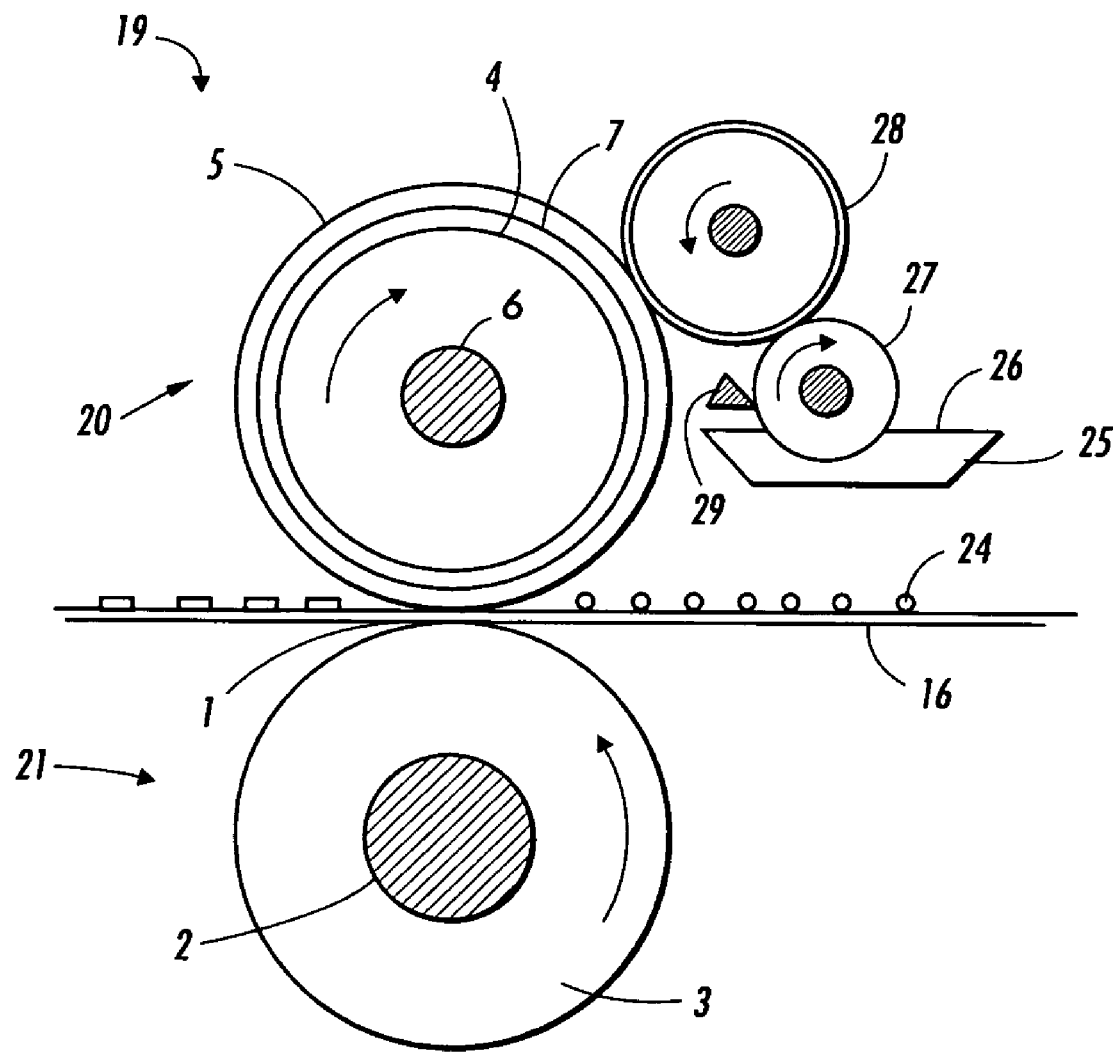
FIG. 2 illustrates a fusing system in accordance with an embodiment herein.

Referring to FIG. 2, an embodiment of a fusing station 19 is depicted with an embodiment of a fuser roll 20 comprising polymer surface 5 on a suitable base member or substrate 4, which in this embodiment is a hollow cylinder or core fabricated from any suitable metal, such as aluminum, anodized aluminum, steel, nickel, copper, or the like, having a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact polymer or elastomer surface 5 of fuser roll 20. As shown in FIG. 2, an embodiment of a backup roll or pressure roll 21 is depicted as having a rigid steel core 2 with a polymer or elastomer surface or layer 3 thereon. Sump 25 contains polymeric release agent 26, which may be a solid or liquid at room temperature, but is a fluid at operating temperatures, and, can be a mixture of an amino-substituted organosiloxane polymer and a nonfunctional organosiloxane polymer. The pressure member 21 can also optionally include a heating element (not shown).

In the embodiment shown in FIG. 2 for applying the polymeric release agent 26 to polymer or elastomer surface 5, two release agent delivery rolls 27 and 28 rotatably mounted in the direction indicated are provided to transport release agent 26 to polymer or elastomer surface 5. Delivery roll 27 is partly immersed in the sump 25 and transports on its surface release agent from the sump to the delivery roll 28. By using a metering blade 29, a layer of polymeric release fluid can be applied initially to delivery roll 27 and subsequently to polymer or elastomer 5 in controlled thickness ranging from submicron thickness to thicknesses of several microns of release fluid. Thus, by metering device 29, from about 0.1 to about 2 microns or greater thicknesses of release fluid can be applied to the surface of polymer or elastomer 5.

Figure 3:
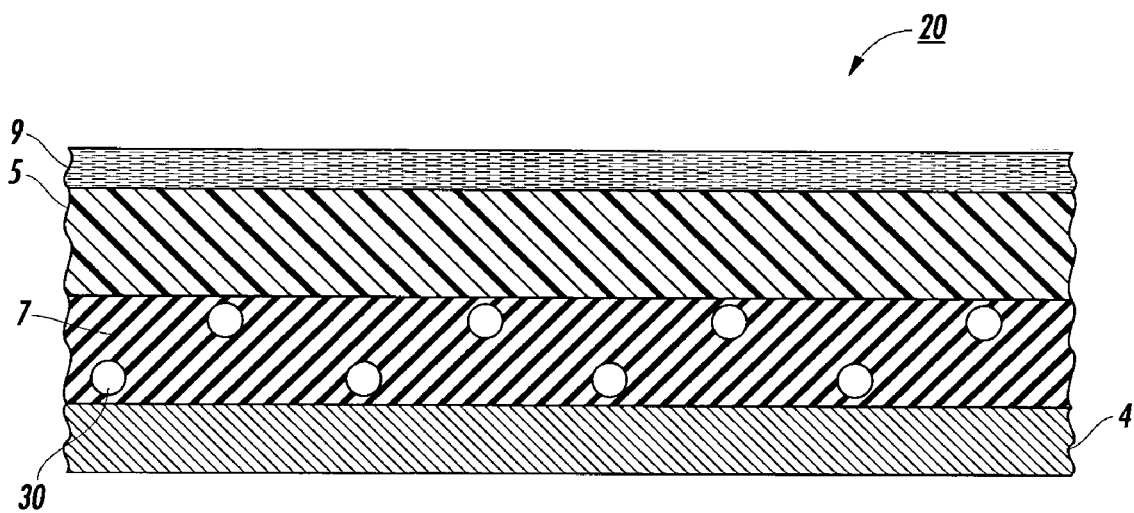
FIG. 3 demonstrates a cross-sectional view of an embodiment herein.

FIG. 3 depicts a cross-sectional view of another embodiment, wherein fuser member 20 comprises substrate 4, optional intermediate surface layer 7 comprising optional fillers 30, and outer polymeric surface layer 5. FIG. 3 also depicts a fluid release agent or fusing oil layer 9 comprising a mixture of an amino-substituted organosiloxane polymer and a nonfunctional organosiloxane polymer.

The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine. The fuser member can be employed in a wide variety of machines, and is not specifically limited in its application to the particular embodiment depicted herein.

Any suitable substrate can be selected for the fuser member. The fuser member substrate can be a roll, belt, flat surface, sheet, film, or other suitable shape used in the fixing of thermoplastic toner images to a suitable copy substrate. It can take the form of a fuser member, a pressure member, or a release agent donor member, and can be in the form of a cylindrical roll. Typically, the fuser member is made of a hollow cylindrical metal core, such as copper, aluminum, stainless steel, or certain plastic materials chosen to maintain rigidity and structural integrity, as well as being capable of having a polymeric material coated thereon and adhered firmly thereto. It is desired that the supporting substrate is a cylindrical sleeve, and can be with an outer polymeric layer of from about 1 to about 6 millimeters. In one embodiment, the core, which can be an aluminum or steel cylinder, is degreased with a solvent and cleaned with an abrasive cleaner prior to being primed with a primer, such as Dow Corning® 1200, which can be sprayed, brushed, or dipped, followed by air drying under ambient conditions for thirty minutes and then baked at 150° C. for 30 minutes.

Also suitable are quartz and glass substrates. The use of quartz or glass cores in fuser members allows for a lightweight, low cost fuser system member to be produced. Moreover, the glass and quartz help allow for quick warm-up, and are therefore energy efficient. In addition, because the core of the fuser member comprises glass or quartz, there is a real possibility that such fuser members can be recycled.

Moreover, these cores allow for high thermal efficiency by providing superior insulation.

When the fuser member is a belt, the substrate can be of any desired or suitable material, including plastics, such as ULTEM®, available from General Electric, ULTRAPEK®, available from BASF, PPS (polyphenylene sulfide) sold under the trade names FORTRON®, available from Hoechst Celanese, RYTON® R-4, available from Phillips Petroleum, and SUPEC®, available from General Electric; PAI (polyamide imide), sold under the trade name TORLON® 7130, available from Amoco; polyketone (PK), sold under the trade name KADEL® E1230, available from Amoco; PL (polyimide); polyaramide; PEEK (polyether ether ketone), sold under the trade name PEEK 450GL30, available from Victrex; polyphthalamide sold under the trade name AMODEL®, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (Xydar®), available from Amoco; and the like, as well as mixtures thereof. These plastics can be filled with glass or other minerals to enhance their mechanical strength without changing their thermal properties. In embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide. Suitable materials also include silicone rubbers. Examples of belt-configuration fuser members are disclosed in, for example, U.S. Pat. No. 5,487,707, U.S. Pat. No. 5,514,436, and Copending application U.S. Ser. No. 08/297,203, filed Aug. 29, 1994, the disclosures of each of which are totally incorporated herein by reference. A method for manufacturing reinforced seamless belts is disclosed in, for example, U.S. Pat. No. 5,409,557, the disclosure of which is totally incorporated herein by reference.

The optional intermediate layer can be of any suitable or desired material. For example, the optional intermediate layer can comprise a silicone rubber of a thickness sufficient to form a conformable layer. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC® 735 black RTV and SILASTIC® 732 RTV, both available from Dow Corning, and 106 RTV Silicone Rubber and 90 RTV Silicone Rubber, both available from General Electric. Other suitable silicone materials include the silanes, siloxanes (such as polydimethylsiloxanes), such as fluorosilicones, dimethylsilicones, liquid silicone rubbers, such as vinyl crosslinked heat curable rubbers or silanol room temperature crosslinked materials, and the like. Other materials suitable for the intermediate layer include polyimides and fluoroelastomers, including those set forth below. Optionally, fillers such as aluminum oxide or the like can be incorporated into the intermediate layer.

The optional intermediate layer typically has a thickness of from about 0.05 to about 10 millimeters, or from about 0.1 to about 5 millimeters, ory from about 1 to about 3 millimeters, although the thickness can be outside of these ranges. More specifically, if the intermediate layer is present on a pressure member, it typically has a thickness of from about 0.05 to about 5 millimeters, or from about 0.1 to about 3 millimeters, or from about 0.5 to about 1 millimeter, although the thickness can be outside of these ranges. When present on a fuser member, the intermediate layer typically has a thickness of from about 1 to about 10 millimeters, or from about 2 to about 5 millimeters, or from about 2.5 to about 3 millimeters, although the thickness can be outside of these ranges. In an embodiment, the thickness of the intermediate layer of the fuser member is higher than that of the pressure member, so that the fuser member is more deformable than the pressure member.

Examples of suitable outer fusing layers of the fuser member include polymers, such as fluoropolymers. Particularly useful fluoropolymer coatings include TEFLON®-like materials such as polytetrafluoroethylene (PTFE), fluorinated ethylenepropylene copolymer (FEP), perfluorovinylalkylether tetrafluoroethylene copolymer (PFA TEFLON®), polyethersulfone, copolymers and terpolymers thereof, and the like.

Other examples include fluoroelastomers and hydrofluoroelastomers. Specifically, suitable fluoroelastomers and hydrofluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. Fluoroelastomers and hydrofluoroelastomers include (1) a class of copolymers of two of vinylidenefluoride, hexafluoropropylene and tetrafluoroethylene, such as those known commercially as VITON® A® (2) a class of terpolymers of vinylidenefluoride, hexafluoropropylene and tetrafluoroethylene known commercially as VITON® B and (3) a class of tetrapolymers of vinylidenefluoride, hexafluoropropylene, tetrafluoroethylene and cure site monomer, these tetrapolymers known commercially as VITON® GH or VITON® GF. The cure site monomer can be 4-bromoperfluorobutene-1, 1,1-dihydro-4-bromoperfluorobutene-1, 3-bromoperfluoropropene-1, 1,1-dihydro-3-bromoperflouropropene-1, or any other suitable, known cure site monomer commercially available from DuPont. The fluoroelastomers VITON® GH and VITON GF® have relatively low amounts of vinylidenefluoride. The VITON® GF and VITON® GH have about 35 weight percent of vinylidenefluoride, about 34 weight percent of hexafluoropropylene and about 29 weight percent of tetrafluoroethylene with about 2 weight percent cure site monomer. Other examples include VITON® A, VITON® B, VITON® E, VITON® E 60C, VITON® E430, VITON® 910, VITON® GH; VITON® GF; and VITON® ETP®. The VITON® designation is a Trademark of E.I. DuPont de Nemours, Inc.

Other commercially available fluoropolymers include FLUOREL® 2170, FLUOREL® 2174, FLUOREL® 2176, FLUOREL® 2177 and FLUOREL® LVS 76, FLUOREL® being a Trademark of 3M Company. Additional commercially available materials include AFLAS™ a poly(propylene-tetrafluoroethylene) and FLUOREL® II (LII900) a poly(propylene-tetrafluoroethylenevinylidenefluoride) both also available from 3M Company, as well as the TECNOFLONS® identified as FOR-60KIR, FOR-LHF, NM FOR-THF, FOR-TFS, TH, and TN505, available from Montedison Specialty Chemical Company.

Other commercially available materials include FLUOREL® 2170, FLUOREL® 2174, FLUOREL® 2176, FLUOREL® 2177, FLUOREL® 2123, and FLUOREL® LVS 76, FLUOREL® being a Trademark of 3M Company. Additional commercially available materials include AFLAS™, a poly(propylene-tetrafluoroethylene), and FLUOREL® II (LII900), a poly(propylene-tetrafluoroethylenevinylidenefluoride) elastomer, both also available from 3M Company, as well as the TECNOFLONS® identified as FOR-60KIR, FOR-LHF, NM, FOR-THF, FOR-TFS, TH, and TN505, available from Montedison Specialty Chemical Company.

Fluoropolymer, and especially fluoroelastomer, materials such as the VITON® materials are beneficial when used as fuser roll coatings at normal fusing temperatures (e.g., from about 50 to about 150° C.). These materials have the superior properties of high temperature stability, thermal conduction, wear resistance, and release oil swell resistance.

TEFLON®-like materials such as polytetrafluoroethylene (PTFE), fluorinated ethylenepropylene copolymers (FEP), and perfluorovinylalkylether tetrafluoroethylene copolymers (PFA TEFLON®), such as polyfluoroalkoxypolytetrafluoroethylene, are often desired because of their increased strength and lower susceptibility to stripper finger penetration. Further, these polymers, in embodiments, can provide the ability to control microporosity, which further provides oil/film control. Other outer surface layers include polymers containing ethylene propylene diene monomer (EPDM), such as those EPDM materials sold under the trade name NORDEL®, available from E. I. Du Pont de Nemours & Co., an example of which is NORDEL® 1440, and POLYSAR® EPDM 345, available from Polysar. In addition, outer surface layers include butadiene rubbers (BR), such as BUDENE® 1207, available from Goodyear, butyl or halobutyl rubbers, such as, EXXON Butyl 365, POLYSAR Butyl 402, EXXON Chlorobutyl 1068, and POLYSAR Bromobutyl 2030. Polymers such as FKM materials (e.g., fluoroelastomers and silicone elastomers) are desired for use in high temperature applications, and EPDM, BR, butyl, and halobutyl materials are preferred for use in low temperature applications, such as transfix and ink applications, and for use with belts.

In yet another embodiment, the polymer is a fluoroelastomer having relatively low fluorine content such as VITON® A201C, which is a copolymer of vinylidene fluoride and hexafluoropropylene, having about 65 percent by weight fluorine content. This copolymer is compounded with crosslinkers and phosphonium compounds used as accelerators.

The fluoroelastomer, in embodiments, has a relatively high fluorine content of from about 65 to about 71 percent by weight, or from about 69 to about 70 percent by weight, or from about 70 percent fluorine by weight of total fluoroelastomer. Less expensive elastomers, such as some containing about 65 percent by weight fluorine, can also be used.

Other suitable fluoropolymers include those such as fluoroelastomer composite materials, which are hybrid polymers comprising at least two distinguishing polymer systems, blocks, or monomer segments, one monomer segment (hereinafter referred to as a "first monomer segment") that possesses a high wear resistance and high toughness, and the other monomer segment (hereinafter referred to as a "second monomer segment") that possesses low surface energy. The composite materials described herein are hybrid or copolymer compositions comprising substantially uniform, integral, interpenetrating networks of a first monomer segment and a second monomer segment, and in some embodiments, optionally a third grafted segment, wherein both the structure and the composition of the segment networks are substantially uniform when viewed through different slices of the fuser member layer. The term "interpenetrating network", in embodiments, refers to the addition polymerization matrix wherein the polymer strands of the first monomer segment and the second monomer segment, as well as those of the optional third grafted segment, are intertwined in one another. A copolymer composition, in embodiments, comprises a first monomer segment and a second monomer segment, as well as an optional third grafted segment, wherein the monomer segments are randomly arranged into a long chain molecule. Examples of polymers suitable for use as the first monomer segment or tough monomer segment include, for example, polyamides, polyimides, polysulfones, fluoroelastomers, and the like, as well as mixtures thereof. Examples of the low surface energy monomer segment or second monomer segment polymers include polyorganosiloxanes and the like, and also include intermediates that form inorganic networks. An intermediate is a precursor to inorganic oxide networks present in polymers described herein. This precursor goes through hydrolysis and condensation followed by the addition reactions to form desired network configurations of, for example, networks of metal oxides such as titanium oxide, silicon oxide, zirconium oxide, and the like; networks of metal halides; and networks of metal hydroxides. Examples of intermediates include metal alkoxides, metal halides, metal hydroxides, and polyorganosiloxanes. The intermediates can be alkoxides, such as tetraethoxy orthosilicate for silicon oxide networks and titanium isobutoxide for titanium oxide networks. In embodiments, a third low surface energy monomer segment is a grafted monomer segment and, in embodiments, is a polyorganosiloxane. In these embodiments, the second monomer segment can be an intermediate to a network of metal oxide. Examples include tetraethoxy orthosilicate for silicon oxide networks and titanium isobutoxide for titanium oxide networks.

Also suitable are volume grafted elastomers. Volume grafted elastomers are a special form of hydrofluoroelastomer, and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. Examples of specific volume graft elastomers are disclosed in, for example, U.S. Pat. No. 5,166,031, U.S. Pat. No. 5,281,506, U.S. Pat. No. 5,366,772, and U.S. Pat. No. 5,370,931, the disclosures of each of which are totally incorporated herein by reference.

Examples of suitable polymer composites include volume grafted elastomers, titamers, grafted titamers, ceramers, grafted ceramers, polyamide polyorganosiloxane copolymers, polyimide polyorganosiloxane copolymers, polyester polyorganosiloxane copolymers, polysulfone polyorganosiloxane copolymers, and the like. Titamers and grafted titamers are disclosed in, for example, U.S. Pat. No. 5,486,987, the disclosure of which is totally incorporated herein by reference; ceramers and grafted ceramers are disclosed in, for example, U.S. Pat. No. 5,337,129, the disclosure of which is totally incorporated herein by reference; and volume grafted fluoroelastomers are disclosed in, for example, U.S. Pat. No. 5,366,772, the disclosure of which is totally incorporated herein by reference. In addition, these fluoroelastomer composite materials are disclosed in U.S. Pat. No. 5,778,290, the disclosure of which is totally incorporated herein by reference.

Other polymers suitable for use herein include silicone rubbers. Suitable silicone rubbers include room temperature vulcanization (RTV) silicone rubbers, high temperature vulcanization (HTV) silicone rubbers, and low temperature vulcanization (LTV) silicone rubbers. These rubbers are known and readily available commercially, such as SILAS- TIC® 735 black RTV and SILASTIC® 732 RTV, both available from Dow Corning, and 106 RTV Silicone Rubber and 90 RTV Silicone Rubber, both available from General Electric. Further examples of silicone materials include Dow Corning SILASTIC® 590 and 591, SYLGARD® 182, and Dow Corning 806A Resin. Other silicone materials include fluorosilicones, such as nonylfluorohexyl and fluorosiloxanes, including DC94003 and Q5-8601, both available from Dow Corning. Silicone conformable coatings, such as X3-6765, available from Dow Corning, are also suitable. Other suitable silicone materials include the siloxanes (such as polydimethylsiloxanes), such as fluorosilicones, dimethylsilicones, liquid silicone rubbers (such as vinyl crosslinked heat curable rubbers or silanol room temperature crosslinked materials), and the like. Suitable silicone rubbers are available also from Wacker Silicones.

Conductive fillers can, optionally, be dispersed in the outer fusing layer of the fuser member, and/or in the intermediate layer, and/or in the substrate, particularly in embodiments wherein a functional fuser oil is used. Examples of fillers are those capable of interacting with the functional groups of the release agent to form a thermally stable film, which releases the thermoplastic resin toner and prevents the toner from contacting the filler surface material itself. This bonding enables a reduction in the amount of oil needed to promote release. Further, fillers promote bonding with the oil without causing problems such as scumming or gelling. In addition, it is desired that the fillers be substantially non-reactive with the outer polymer material so that no adverse reaction occurs between the polymer material and the filler which would hinder curing or otherwise negatively affect the strength properties of the outer surface material. Fillers in the outer fusing layer can also increase thermal conductivity.

Other adjuvants and fillers can be incorporated in the polymer of the outer fusing layer, provided that they do not affect the integrity of the polymer material. Such fillers normally encountered in the compounding of elastomers include coloring agents, reinforcing fillers, processing aids, accelerators, and the like. Oxides, such as magnesium oxide, and hydroxides, such as calcium hydroxide, are suitable for use in curing many fluoroelastomers. Proton acids, such as stearic acid, are suitable additives in EPDM and BR polymer formulations to improve release by improving bonding of amino oils to the elastomer composition. Other metal oxides, such as cupric oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a fluoropolymer outer fusing layer can increase release of toner from the fuser member during and following the fusing process. Processability of a fluoropolymer outer fusing layer can be increased by increasing absorption of silicone oils, in particular by adding fillers such as fumed silica or clays such as organo-montmorillonites. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

The polymer layers of the fuser member can be coated on the fuser member substrate by any desired or suitable means, including normal spraying, dipping, and tumble spraying techniques. A flow coating apparatus as described in Copending application U.S. Ser. No. 08/672,493 filed Jun. 26, 1996, entitled "Flow Coating Process for Manufacture of Polymeric Printer Roll and Belt Components," the disclosure of which is totally incorporated herein by reference, can also be used to flow coat a series of fuser rolls. It is desired that the polymers be diluted with a solvent, and particularly an environmentally friendly solvent, prior to application to the fuser substrate. Alternative methods, however, can be used for coating layers, including methods described in Copending application U.S. Ser. No. 09/069,476, filed Apr. 29, 1998, entitled "Method of Coating Fuser Members," the disclosure of which is totally incorporated herein by reference.

Other optional layers, such as adhesive layers or other suitable cushion layers or conductive layers, can also be incorporated between the outer polymer layer and the substrate. Optional intermediate adhesive layers and/or polymer layers can be applied to achieve desired properties and performance objectives. An adhesive intermediate layer can be selected from, for example, epoxy resins and polysiloxanes. Examples of suitable adhesives include materials such as THIXON® 403/404, Union Carbide A-1100, Dow TACTIX® 740, Dow TACTIX® 741, Dow TACTIX® 742, Dow Corning P5200, Dow Corning S-2260, Union Carbide A-1100, and United Chemical Technologies A0728. A curative for the aforementioned adhesives can be Dow H41. Examples of adhesive(s) for silicone adhesion include A4040 silane, available from Dow Corning Corp., Midland, Mich. 48686, D.C. 1200, also available from Dow Corning, and S-11 silane, available from Grace Specialty Polymers, Lexington, Mass. Adhesion of fluorocarbon elastomers can be accomplished with CHEMLOK® 5150, available from Lord Corp., Coating and Lamination Division, Erie, Pa.

Polymeric fluid release agents can be used in combination with the polymer outer layer to form a layer of fluid release agent, which results in an interfacial barrier at the surface of the fuser member while leaving a non-reacted low surface energy release fluid as an outer release film. Suitable release agents include both functional and non-functional fluid release agents. The term "nonfunctional oil" as used herein, refers to oils which do not contain organic functional groups on the backbone or pendant groups on the siloxane polymer which can react chemically with the fillers on the surface of the fuser member or the polymer matrix which comprises the top layer of the fuser member. The term "functional oil" as used herein, refers to a release agent having functional groups which can react chemically with the fillers present on the surface of the fuser member or the polymer matrix which comprises the top layer of the fuser member so as to reduce the surface energy of the fillers and thereby provide better release of toner particles from the surface of the fuser member. The polymeric release agents are mixtures of unsubstituted or nonfunctional organosiloxane polymers and amino-substituted organosiloxane polymers.

Examples of unsubstituted organosiloxane polymers include those of the general formula

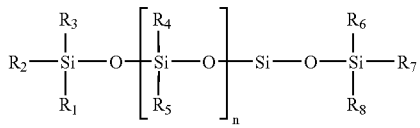

wherein each of $R_1$, $R_2$, $R_3$, $R_4$, $R_5$, $R_6$, $R_7$, and $R_8$, independently of the others, is an alkyl group, including linear, branched, cyclic, unsaturated, and substituted alkyl groups, typically with from about 1 to about 18 carbon atoms, or from about 1 to about 8 carbon atoms, or from about 1 to about 6 carbon atoms, or from about 1 to about 3 carbon atoms, although the number of carbon atoms can be outside of these ranges, an aryl group, including substituted aryl groups, typically with from about 6 to about 18 carbon atoms, or from about 6 to about 10 carbon atoms, or from about 6 to about 8 carbon atoms, although the number of carbon atoms can be outside of this range, or an arylalkyl group (with either the alkyl or the aryl portion of the group being attached to the silicon atom), including substituted arylalkyl groups, typically with from about 7 to about 18 carbon atoms, or from about 7 to about 12 carbon atoms, or from about 7 to about 9 carbon atoms, although the number of carbon atoms can be outside of these ranges, wherein at least one of $R_4$, and $R_5$ can, if desired, also be a polyorganosiloxane chain with from about 1 to about 100 repeat diorganosiloxane monomer units, and wherein the substituents on the substituted alkyl, aryl, or arylalkyl groups do not include functional groups such as amino groups, mercapto groups, hydride groups, or other groups that react chemically with the fillers on the surface of the fuser member or with the polymer matrix that comprises the top layer of the fuser member. Further, n is an integer representing the number of repeat monomer units; typically, n is from about 50 to about 5,000, although the number of repeat monomer units can be outside of this range. These polymers generally are random copolymers of siloxane repeat units, although alternating, graft, and block copolymers are also suitable. In an embodiment, all of the R groups are methyl groups. Specific examples of suitable materials of this formula include poly(dimethylsiloxanes), of the general formula

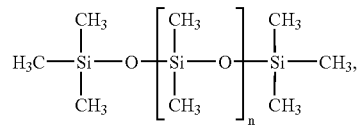

poly(phenylmethylsiloxanes), of the general formula

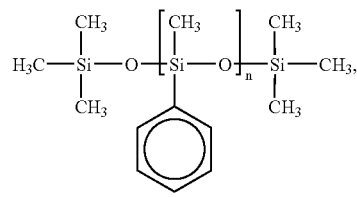

dimethylsiloxane/phenylmethylsiloxane random copolymers, of the general formula

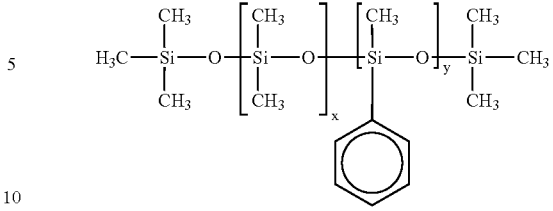

wherein x and y are integers representing the number of repeat monomer units and are from about 50 to about 5,000, or from about 50 to about 1,000, poly(silylphenylenes), of the general formula

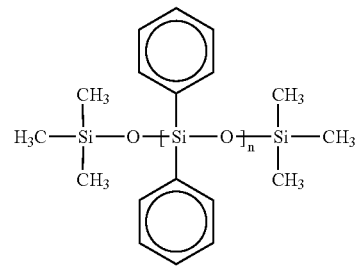

wherein n is an integer representing the number of repeat monomer units, and is from about 50 to about 5,000, or from about 50 to about 1,000, dimethyl siloxane/diphenyl siloxane random copolymers, of the general formula

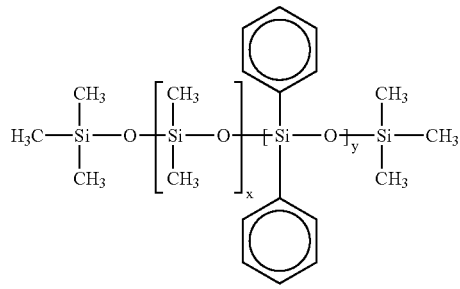

wherein x and y are integers representing the number of repeat monomer units, and are from about 50 to about 5,000, or from about 50 to about 1,000 and the like. Materials of these formulas are commercially available from, for example Dow Corning Co., Midland, Mich., United Chemical Technologies, Piscataway, N.J., and the like. T-Type nonfunctional silicone oils are also suitable.

The nonfunctional organosiloxane polymer is of any suitable or desired effective weight average molecular weight. Typically from about 5,000 to about 50,000, or from about 10,000 to about 25,000, although the weight average molecular weight can be outside of these ranges.

The nonfunctional organosiloxane polymer generally has a viscosity at about 25° C. of from about 100 to about 2,000 centistokes, or from about 500 to about 1,000 centistokes, although the viscosity can be outside of these ranges.

The concentrate comprising the amino-substituted or mercapto-substituted organosiloxane polymer has amino or mercapto functional groups pendant from at least some of the polymer molecules therein. Specific examples of suitable amino functional silicone oils include T-Type amino functional silicone release agents, as disclosed in, for example U.S. Pat. No. 5,516,361, monoamino functional silicone release agents, as described in, for example U.S. Pat. No. 5,531,813, and amino functional siloxane release agents, as disclosed in, for example, U.S. Pat. No. 5,512,409, the disclosures of each of which are totally incorporated herein by reference. Specific examples of suitable mercapto functional silicone oils include those disclosed in, for example, U.S. Pat. No. 4,029,827, the disclosure of which is totally incorporated herein by reference. Other functional silicone oils include those described in, for example, U.S. Pat. No. 4,101,686, U.S. Pat. No. 4,146,659, and U.S. Pat. No. 4,185,140, the disclosures of each of which are totally incorporated herein by reference. Other release agents include those described in, for example, U.S. Pat. No. 4,515,884 and U.S. Pat. No. 5,493,376, the disclosures of each of which are totally incorporated herein by reference.

Examples of amino-substituted organosiloxane polymers are of the general formula

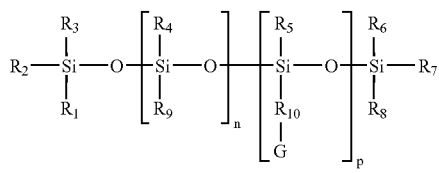

wherein G is $-NHR_{11}$, each of $R_1$, $R_2$, $R_3$, $R_4$, $R_5$, $R_6$, $R_7$, $R_8$, and $R_9$ independently of the others, is an alkyl group, including linear, branched, cyclic, and unsaturated alkyl groups, typically with from about 1 to about 18 carbon atoms, or from about 1 to about 8 carbon atoms, or from about 1 to about 6 carbon atoms, or from about 1 to about 3 carbon atoms, although the number of carbon atoms can be outside of these ranges, an aryl group, including substituted aryl groups, typically with from about 6 to about 18 carbon atoms, or from about 6 to about 10 carbon atoms, or from about 6 to about 8 carbon atoms, although the number of carbon atoms can be outside of this range, or an arylalkyl group (with either the alkyl or the aryl portion of the group being attached to the silicon atom), including substituted arylalkyl groups, typically with from about 7 to about 18 carbon atoms, or from about 7 to about 12 carbon atoms, or from about 7 to about 9 carbon atoms, although the number of carbon atoms can be outside of these ranges, wherein at least one of $R_4$, $R_5$, and $R_9$ can, if desired, also be a polyorganosiloxane chain with from about 1 to about 100 repeat diorganosiloxane monomer units, $R_{10}$ is an alkyl or arylalkyl group, the alkyl group, including linear, branched, cyclic, and unsaturated alkyl groups, typically with from about 1 to about 18 carbon atoms, or from about 1 to about 8 carbon atoms, or from about 1 to about 6 carbon atoms, or from about 1 to about 3 carbon atoms, or about 3 carbon atoms, such as an n-propyl group, although the number of carbon atoms can be outside of these ranges, the arylalkyl group (with either the alkyl or the aryl portion of the group being attached to the silicon atom), including substituted arylalkyl groups, typically with from about 7 to about 18 carbon atoms, or from about 7 to about 12 carbon atoms, or from about 7 to about 9 carbon atoms, although the number of carbon atoms can be outside of these ranges, and $R_{11}$ is a hydrogen atom, an alkyl group, or an arylalkyl group, the alkyl group, including linear, branched, cyclic, and unsaturated alkyl groups, typically with from about 1 to about 18 carbon atoms, or from about 1 to about 8 carbon atoms, or from about 1 to about 6 carbon atoms, or from about 1 to about 3 carbon atoms, although the number of carbon atoms can be outside of these ranges, the arylalkyl group (with either the alkyl or the aryl portion of the group being attached to the silicon atom), including substituted arylalkyl groups, typically with from about 7 to about 18 carbon atoms, or from about 7 to about 12 carbon atoms, or from about 7 to about 9 carbon atoms, although the number of carbon atoms can be outside of these ranges. Further, p and n are each integers representing the number of repeat monomer units; typically, p is from 0 to about 5 and n is from about 50 to about 5,000, although the number of repeat monomer units can be outside of this range. In the concentrate, the mole percent of amino substituents typically is from about 0.3 to about 0.4 mole percent, or from about 0.31 to about 0.38, or from about 0.32 to about 0.35.

The amino-substituted organosiloxane polymer is of any suitable or desired effective weight average molecular weight, typically from about 4,000 to about 20,000, or from about 12,000 to about 18,000.

The amino-substituted organosiloxane polymer concentrate generally has a viscosity at about 25° C. of from about 800 to about 1,300 centistokes, or from about 800 to about 1,200 centistokes, or from about 800 to about 1,000.

The diluent comprising the nonfunctional organosiloxane polymer and the concentrate comprising the amino-substituted organosiloxane polymer are generally present in the mixture in relative amounts by weight of from about 1 part concentrate per about 2 parts diluent to about 1 part concentrate per about 30 parts diluent, or from about 1 part concentrate per about 3 parts diluent to about 1 part concentrate per about 10 parts diluent.

The resulting mixture typically has a viscosity at about 25° C. of from about 550 to about 1,300 centistokes, or from about 800 to about 1,300 centistokes, or from about 1,025 to about 1,300.

In the mixture, the mole percent of amino substituents typically is from about 0.05 to about 0.3 percent, or from about 0.08 to about 0.25, or from about 0.08 to about 0.1, or from about 0.08 to about 0.09 mole percent.

The release agents comprising the mixture of concentrate and diluent remain functionally fluid at temperatures typically of up to about 500° F., or from about 30 to about 450° F.

In embodiments, the release agent forms a continuous film on the polymer surface of the fuser member. The silicone oils are typically supplied in an amount of from about 0.1 to about 20 microliters per copy, or from about 2 to about 15 microliters per copy, or from about 5 to about 12 microliters per copy, although the amount can be outside of these ranges.

While not being limited to any particular theory, it is believed that lower viscosity fusing oils diffuse into paper faster than higher viscosity fusing oils of the same composition, all conditions being equal, and that functional fusing oils diffuse into paper more slowly than nonfunctional fusing oils of the same composition, all conditions being equal; in the instant invention, it is believed that the diluent portion of the mixture, i.e., the high viscosity nonfunctional oil, diffuses into paper faster than the concentrate portion of the mixture, i.e., the low viscosity amino functional oil. Accordingly, any low viscosity functional fusing agent molecules chemisorbed onto the paper surface provide insufficient coverage to impair the adhesion of Post-It® notes to the prints, since the low viscosity amino-substituted polymer diffuses into the paper faster than would a similar functional fusing oil of high viscosity. Again, while not being limited to any particular theory, it is believed that the increased release life observed with the mixtures, compared to a similar blend containing a low viscosity concentrate and a low viscosity diluent, results from improved hydrodynamics of the fusing agent metering system (such as a donor roll or the like). More specifically, it is believed that when one or more dust particles, toner particles, paper particles, or the like are trapped under a metering blade, the fusing agent level in that region of the fuser member is depleted when a low viscosity fusing agent is employed; the depleted fusing agent level on the fuser member promotes toner offset, which can be invisible initially, but will later accelerate to visible offset. Specific offset observed with the low viscosity fusing release agent generally begins as a fine streak less than one millimeter in width, and then grows in width as more streaks appear. In contrast, with the mixtures making up the fusing release agents, the level of fusing agent on the fuser member is substantially more uniform, and offset is not observed until many more copies have been made, said offset appearing as a spot.

Specific embodiments will now be described in detail. These examples are intended to be illustrative, and the invention is not limited to the materials, conditions, or process parameters set forth in these embodiments. All parts and percentages are by weight unless otherwise indicated.

EXAMPLES

Comparative Example 1

Preparation of Known Amino Functional Silicone Oil

Several standard amino functional silicone release agents were used in proprietary stress tests for failure modes in a high-speed color fusing application. These samples were denoted by F1, F2 and F3. These are known release agents used in commercial machine architecture, and are representative of the performance of a currently produced fluid. Concentrate fluid properties of these fluids ranged from 250–400 cP and 0.45–0.60 mole percent amine. The two diluents used in the blended composition were non-functional polydimethylsiloxane (PDMS) and range in viscosity of from about 240 to about 400 cP, and from about 900 to about 100 cP, respectively. The final blended composition had an amine functionality ranging from about 0.04 to about 0.12 mole percent amine, and from about 500 to about 700 cP. The stripping test was performed to 60,000 prints suspension. The offset testing was performed to 73K prints suspension. The started wavy gloss was tested to 60K prints suspension. The results are shown in Table 1 below.

In the examples, "susp" means the test was suspended. The suspension point is the medium requirement for a stress test to qualify as an acceptable fluid.

TABLE 1

| Sample | Stripping Test (K Prints) | Offset Test (K Prints) | Started Wavy Gloss (K Prints) | Failed for Wavy Gloss (K Prints) |
|---|---|---|---|---|
| F1 | 24 | 68.8 | 1.1 | 1.1 |
| F2 | 38.9 | 40.5 | 1.1 | 1.1 |
| F3 | 46.2 | 23.4 | 1.1 | 2.1 |

Example 2

Preparation of Amino Functional Silicone Oil

Table 2 below shows the results of the candidate fluid. Candidate improved fluids, denoted by P1–P6 are structurally identical, but synthesized in different production batches. All production fluids, as compared to similar testing as the fluids listed in FIG. 1, have shown improvement in stripping stress testing relative to the current fluids, F1–F3. Several blends of the two fluid structures were also tested for both failure modes. As shown in the data, Fluids P1-2-3 and P4-5-6, both a 1:1:1 blend of the three production fluid batches, also exhibited improved performance over the current production fluids, F1–F3. Concentrate fluid properties of these fluids ranged from 950–1150 cP and 0.30–0.40 mole percent amine. The two diluents used in the blended composition were non-functional PDMS and ranged in viscosity from about 250 to about 400 cP, and from about 900 to about 1,000 cP, respectively. The final blended composition had an amine functionality ranging from about 0.07 to about 0.12 mole percent amine, and from about 500 to about 700 cP.

TABLE 2

| Sample | Stripping Test (K Prints) | Offset Test (K Prints) | Started Wavy Gloss (K prints) | Failed for Wavy Gloss (K Prints) |
|---|---|---|---|---|
| P1 | 96 | 117 | No failure | No failure |
| P2 | 85 | 58 | No failure | No failure |
| P3 | 62-susp | 73-susp | No failure | No failure |
| P4 | 62-susp | 73-susp | No failure | No failure |
| P5 | 62-susp | 73-susp | No failure | No failure |

Other embodiments and modifications may occur to those of ordinary skill in the art subsequent to a review of the information presented herein; these embodiments and modifications, as well as equivalents thereof, are also included within the scope of this invention.

What is claimed is:

1. A fuser member comprising a substrate, a layer thereover comprising a polymer, and, on the polymeric layer, a coating of a release agent comprising a mixture of (a) an organosiloxane polymer concentrate containing amino-substituted organosiloxane polymers, wherein there are amino functional groups on at least some of the polymer molecules of the concentrate, said concentrate having a degree of functionality of from about 0.3 to about 0.4 mole percent, said concentrate having a viscosity of from about 800 to about 1,300 centistokes; and (b) a nonfunctional organosiloxane polymer diluent, said diluent having a viscosity of from about 100 to about 2,000 centistokes; said mixture having a degree of functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

2. A fuser member according to claim 1, wherein the concentrate component of the release agent has a viscosity of from about 800 to about 1,200 centistokes.

3. A fuser member according to claim 2, wherein the concentrate component of the release agent has a viscosity from about 800 to about 1,000 centistokes.

4. A fuser member according to claim 1, wherein the mixture has a viscosity of from about 800 to about 1,300 centistokes.

5. A fuser member according to claim 4, wherein the mixture has a viscosity of from about 1,025 to about 1,300 centistrokes.

6. A fuser member according to claim 1, wherein said diluent has a viscosity of from about 100 to about 1,000 centistrokes.

7. A fuser member according to claim 6, wherein said diluent has a viscosity of from about 500 to about 1,000 centistrokes.

8. A fuser member according to claim 1, wherein the mixture contains amino-functional organosiloxane polymers and has a degree of amino functionality of from about 0.08 to about 0.25 mole percent.

9. A fuser member according to claim 8, wherein the mixture contains amino-functional organosiloxane polymers and has a degree of amino functionality of from about 0.08 to about 0.1 mole percent.

10. A fuser member according to claim 9, wherein the mixture contains amino-functional organosiloxane polymers and has a degree of amino functionality of from about 0.08 to about 0.09 mole percent.

11. A fuser member according to claim 1, wherein the concentrate contains amino-functional organosiloxane polymers and has a degree of amino functionality of from about 0.31 to about 0.38 mole percent.

12. A fuser member according to claim 11, wherein the concentrate contains amino-functional organosiloxane polymers and has a degree of amino functionality of from about 0.32 to about 0.35 mole percent.

13. A fuser member according to claim 1, wherein the polymer in the layer overlying the substrate is a fluoroelastomer.

14. A fuser member according to claim 13, wherein said fluoroelastomer is selected from the group consisting of a) copolymers of two of vinylidene fluoride, hexafluoropropylene, and tetrafluoroethylene; b) terpolymers of vinylidene fluoride, hexafluoropropylene, and tetrafluoroethylene; and c) tetrapolymers of vinylidene fluoride, hexafluoropropylene, tetrafluoroethylene, and a cure site monomer.

15. A fuser member according to claim 14, wherein said fluoroelastomer comprises about 35 weight percent of vinylidenefluoride, about 34 weight percent of hexafluoropropylene, about 29 weight percent of tetrafluoroethylene, and about 2 weight percent cure site monomer.

16. A fuser member according to claim 1, wherein the amino-substituted organosiloxane polymer is of the formula

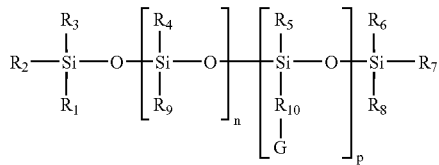

wherein G is —NHR$_{11}$, each of R$_1$, R$_2$, R$_3$, R$_4$, R$_5$, R$_6$, R$_7$, R$_8$, and R$_9$ the others, are alkyl groups or arylalkyl groups, R$_{10}$ is an alkyl group or an arylalkyl group, R$_{11}$ is a hydrogen atom, an alkyl group, or an arylalkyl group, and n and p are each integers representing the number of repeat monomer units and is from about 50 to about 5,000.

17. A fuser member according to claim 1, wherein the nonfunctional organosiloxane polymer is of the formula

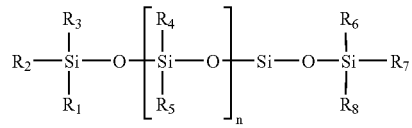

wherein each of R$_1$, R$_2$, R$_3$, R$_4$, R$_5$, R$_6$, R$_7$, and R$_8$, independently of the others, is an alkyl group, an aryl group, or an arylalkyl group, and n is an integer representing the number of repeat monomer units and is from about 50 to about 5,000.

18. An image forming apparatus for forming images on a recording medium, the apparatus comprising: (i) a charge-retentive surface capable of receiving an electrostatic latent image thereon; (ii) a development assembly to apply toner to the charge-retentive surface, thereby developing the electrostatic latent image to form a developed toner image on the charge retentive surface; (iii) a transfer assembly to transfer the developed toner image from the charge retentive surface to a copy substrate; and (iv) a fixing assembly to fuse the developed toner image to a surface of the copy substrate, wherein the fixing assembly comprises a fixing component comprising a substrate, a layer thereover comprising a polymer, and, on the polymeric layer, a coating of a release agent comprising a mixture of (a) an organosiloxane polymer concentrate containing amino-substituted organosiloxane polymers, wherein there are amino functional groups on at least some of the polymer molecules of the concentrate, said concentrate having a degree of functionality of from about 0.3 to about 0.4 mole percent, said concentrate having a viscosity of from about 800 to about 1,300 centistokes; and (b) a nonfunctional organosiloxane polymer diluent, said diluent having a viscosity of from about 100 to about 2,000 centistokes; said mixture having a degree of functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

19. An image forming apparatus for forming images on a recording medium, the apparatus comprising: (i) a charge-retentive surface capable of receiving an electrostatic latent image thereon; (ii) a development assembly to apply toner to the charge-retentive surface, thereby developing the electrostatic latent image to form a developed toner image on the charge retentive surface; (iii) a transfer assembly to transfer the developed toner image from the charge retentive surface to a copy substrate; and (iv) a fixing assembly to fuse the developed toner image to a surface of the copy substrate, wherein the fixing assembly comprises a fixing component comprising a substrate, a layer thereover comprising a fluoroelastomer selected from the group consisting of a) copolymers of two of vinylidene fluoride, hexafluoropropylene, and tetrafluoroethylene; b) terpolymers of vinylidene fluoride, hexafluoropropylene, and tetrafluoroethylene; and c) tetrapolymers of vinylidene fluoride, hexafluoropropylene, tetrafluoroethylene, and a cure site monomer, and, on the fluoroelastomer layer, a coating of a release agent comprising a mixture of (a) an organosiloxane polymer concentrate containing amino-substituted organosiloxane polymers, wherein there are amino functional groups on at least some of the polymer molecules of the concentrate, said concentrate having a degree of functionality of from about 0.3 to about 0.4 mole percent, said concentrate having a viscosity of from about 800 to about 1,300 centistokes; and (b) a nonfunctional organosiloxane polymer diluent, said diluent having a viscosity of from about 100 to about 2,000 centistokes; said mixture having a degree of functionality of from about 0.05 to about 0.3 mole percent, wherein the mixture has a viscosity of from about 550 to about 1,300 centistokes, and wherein the ratio by weight of concentrate to diluent is from about 1:2 to about 1:30.

* * * * *